(12) United States Patent
Frantz

(10) Patent No.: US 6,532,780 B1
(45) Date of Patent: Mar. 18, 2003

(54) WHEEL LOCK ASSEMBLY

(76) Inventor: Donald R. Frantz, 1785 S. Johns Rd., New Berlin, WI (US) 53146

( * ) Notice: Subject to any disclaimer, the term of this patent is extended or adjusted under 35 U.S.C. 154(b) by 0 days.

(21) Appl. No.: 10/021,729

(22) Filed: Oct. 29, 2001

(51) Int. Cl.$^7$ .......................... B60R 25/00; F16B 41/00
(52) U.S. Cl. ............................ 70/225; 70/226; 70/232; 70/259
(58) Field of Search ................... 70/229–232, 225–227, 70/259, 260

(56) References Cited

U.S. PATENT DOCUMENTS

| | | | | |
|---|---|---|---|---|
| 1,259,974 A | * | 3/1918 | Gingrich | |
| 1,657,448 A | * | 1/1928 | Amsden | |
| 1,662,294 A | * | 3/1928 | Bettinardi | |
| 1,837,683 A | * | 12/1931 | Skaggs | |
| 1,858,893 A | * | 5/1932 | Heyer | |
| 2,304,515 A | * | 12/1942 | Turnbull | |
| 3,537,548 A | * | 11/1970 | Jeppesen | 70/225 X |
| 3,711,117 A | * | 1/1973 | Penner et al. | 70/226 X |
| 3,713,668 A | * | 1/1973 | Flindt | 70/227 X |
| 3,845,643 A | * | 11/1974 | Barrett | 70/18 |
| 4,869,084 A | * | 9/1989 | Mack, Jr. | 70/259 |
| 5,410,897 A | | 5/1995 | Edmondson | 70/226 |
| 5,463,885 A | * | 11/1995 | Warren, Sr. | 70/18 |
| 5,832,759 A | * | 11/1998 | Yamabe | 70/226 |

FOREIGN PATENT DOCUMENTS

| | | | | |
|---|---|---|---|---|
| FR | 55376 | * | 6/1952 | 70/227 |
| GB | 2037242 | * | 7/1980 | 70/259 |
| GB | 2091182 | * | 7/1982 | 70/226 |
| GB | 2170765 | * | 8/1986 | 70/237 |
| NO | 93730 | * | 2/1959 | 70/259 |

* cited by examiner

*Primary Examiner*—Lloyd A. Gall
(74) *Attorney, Agent, or Firm*—Joseph S. Heino

(57) ABSTRACT

A wheel locking assembly provides a mounting base that can be permanently attached to a wheel stud underneath the lug nut, the mounting base providing a platform for a cylinder lock, a length of chain or the like, and a cylinder lock that, when locked, secures both ends of the chain. A rectangular chain connector is provided and fits over the mounting base such that a square column of the mounting base engages a square hole of the connector. A circular chain connector is also provided and overlays the rectangular chain connector. The rectangular chain connector is attached to one end of a chain and the circular chain connector attached to the other end. The cylinder lock engages a latch portion of the mounting column. The device of the present invention further provides an easy and convenient assembly that is designed to secure small vehicles with a wide variety of wheel sizes.

15 Claims, 2 Drawing Sheets

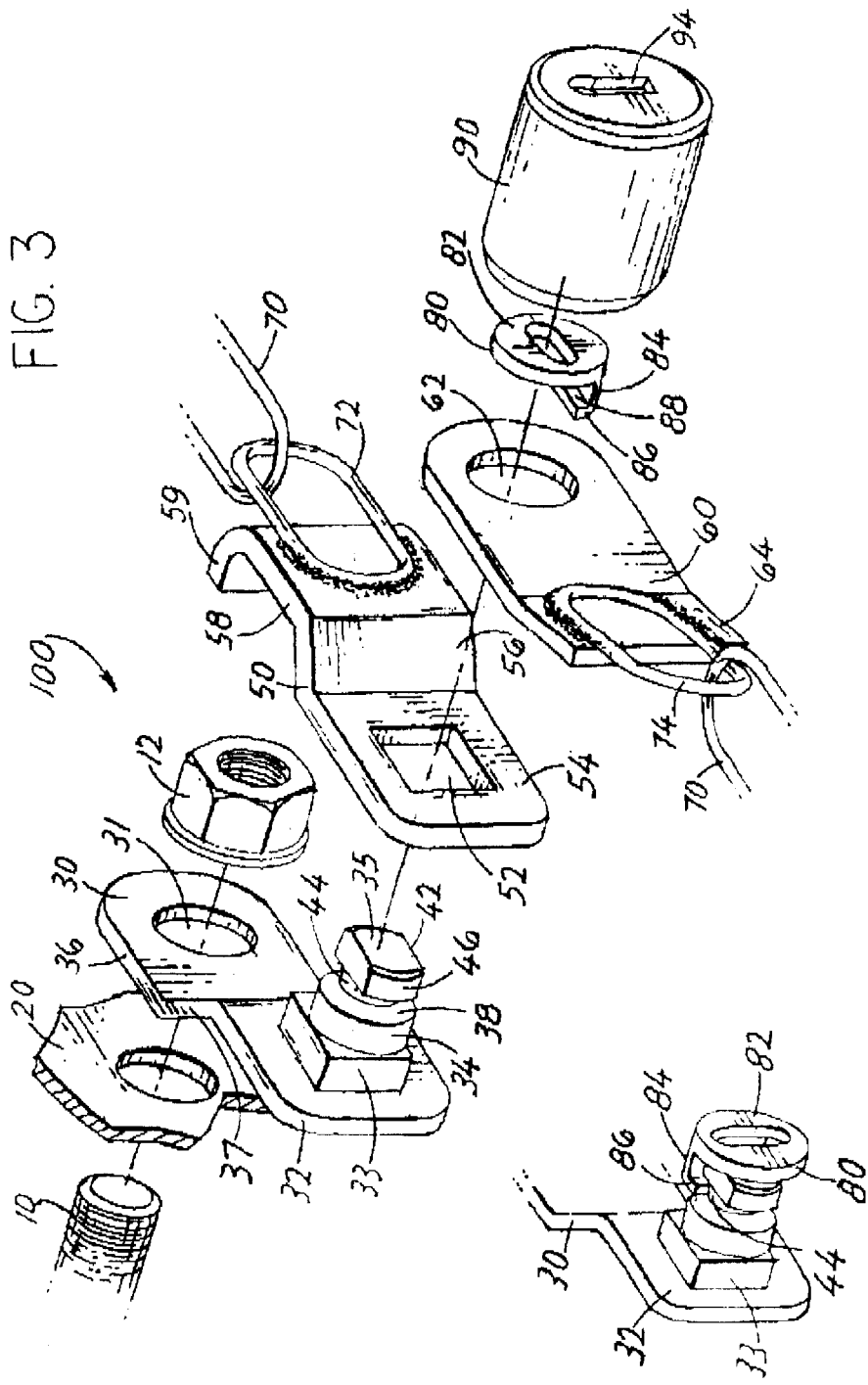

WHEEL LOCK ASSEMBLY

FIELD OF THE INVENTION

The present invention relates to locks and restraining devices for securing the wheel of a movable vehicle. More specifically, the device of the present invention relates to an assembly that both immobilizes the vehicle and secures at least one of the wheels and tires of the vehicle from theft.

BACKGROUND OF THE INVENTION

Unfortunately, the art of thievery is even older than the art of wheel building. Despite all of the incredible technological and social advances since the invention of the wheel, some elements of society still find it necessary to steal wheeled vehicles.

Those involved in the art of modern day thievery have also enjoyed an increase in the number of targets for theft. The vast creation of wealth in our economy has allowed people to purchase new luxury items such as boats and all terrain vehicles to enjoy both at their homes and at their places of recreation.

Additionally, such items as all terrain vehicles, trailers, boat trailers, riding lawn mowers, tractors and other small vehicles are particularly attractive targets for thieves because of the relative ease with which they can be either pushed onto a truck or driven away. Accordingly, these luxury items need to be properly secured when not in use. The present invention provides an effective and inexpensive device for securing these valuables against the possibility of theft.

In the experience of this inventor, there are several known devices that are designed to prevent theft as described above. Typical of these are the locking mechanisms that are designed to enter a wheel from one side and extend through the spokes of the wheel to the opposite side. Obviously, these are not useful on a vehicle or trailer having wheels with solid rims. Other devices provide a mechanism for attaching a pair of wheels on a vehicle to each other so that neither one of the wheels may rotate without damage to the vehicle if the vehicle is moved. Such devices, however, are much larger and more complicated than the device of the present invention and, hence, are unlikely to be used on a regular basis. Yet another device teaches a wheel lock that comprises a bar attached to the lug nuts of the wheel that extends forward and has a chock.

The assembly of the present invention takes advantage of the lug nuts already provided by the maker of the trailer or vehicle by providing a device which may be securely attached to one of those lug nuts and a chain, or the like, that is long enough to encircle a support member of the wheel that is to be secured. In such a manner, the vehicle is secured from being driven or pushed away and the wheel is impossible to steal.

SUMMARY OF THE INVENTION

In accordance with the present invention, it is contemplated that, in light of the previously alluded to problems that have existed and that continue to exist in this field, a primary objective of the device of the present invention is to provide a wheel-locking assembly that either deters, or renders impossible, unauthorized movement of the vehicle to which it is attached. A further object of the present invention is to provide such a device that can be attached conveniently and easily. It is a further object of the present invention to provide such a wheel-locking assembly that is adaptable to a wide variety of wheel sizes and that is particularly useful with solid wheels. It is also an object of the present invention to provide a wheel-locking assembly that is easy to carry and store when not in use. A further object of the invention is to provide a relatively simple assembly that is inexpensive to produce and relatively inexpensive to purchase.

The device of the present invention attains the above objectives. In general, the assembly of the present invention provides a mounting base that can be permanently attached to a wheel stud underneath the lug nut, the mounting base providing a platform for a cylinder lock, a length of chain or the like, and a cylinder lock that, when locked, secures both ends of the chain. The device of the present invention further provides an easy and convenient assembly that is designed to secure small vehicles with a wide variety of wheel sizes. The device of the present invention can be inexpensively manufactured and sold. It prevents wheel theft, in addition to vehicle theft, and is particularly useful with solid wheels.

Other objects, advantages and capabilities of the invention will become apparent from the following detailed description taken in conjunction with the accompanying drawings showing a preferred embodiment of the device of the present invention.

BRIEF DESCRIPTION OF THE DRAWINGS

FIG. 3 is a front, top and left side exploded perspective view of the wheel locking device shown in FIGS. 1 and 2.

FIG. 4 is a front, top and left side perspective view of the mounting base and retainer portion of the wheel locking device shown in FIG. 3 and showing the device in a locked state.

DETAILED DESCRIPTION

Figure 1:
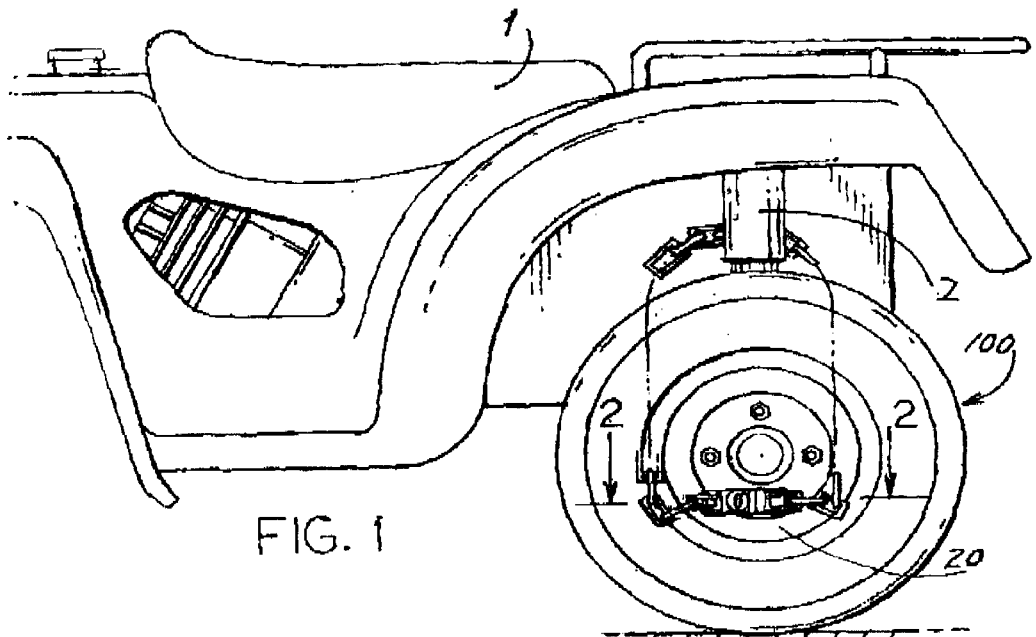
FIG. 1 is a front elevational view of the wheel-locking device of the present invention, shown installed on an all terrain vehicle (or "ATV"), for example.

Referring now to the drawings in detail, wherein like referenced characters designate corresponding elements throughout the several views, FIG. 1 depicts an overall view of the assembly of the present invention, generally identified 100, installed on a wheel 20 of a vehicle 1. In general, the assembly 100 provides a mounting base 30 that is attached to the wheel stud 10 of the vehicle 1. It is to be understood that the type of vehicle 1 illustrated is an example only. The vehicle 1 could be any type of all terrain vehicle, riding lawn mower, tractor, boat trailer, or other movable wheeled vehicle. A length of chain 70 is used to encircle a fixed object, such as a shock-absorber 2, on the vehicle 1 so that the vehicle 1 is immobilized and the wheel 20 is safe from theft.

Figure 2:
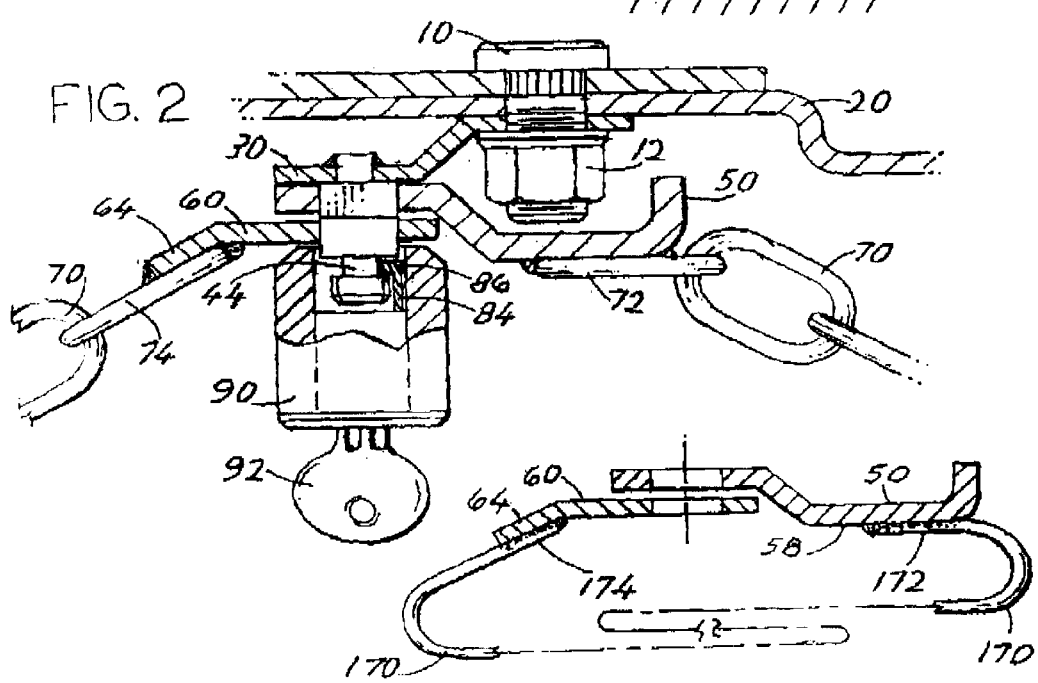
FIG. 2 is a top plan and sectional view of the wheel locking device shown in FIG. 1 and taken along line 2—2 of FIG. 1.

In detail, the wheel stud 10 is an ordinary wheel stud such as is found on nearly every wheeled vehicle in this inventor's experience. Similarly, the lug nut 12 employed is also typical and no different than any other lug nut. However, between the wheel 20 and the lug nut 12, the device of the present invention calls for a mounting base 30. In the preferred embodiment, the mounting base 30 of the assembly 100 consists of a metal strip that is bent slightly upwardly from the wheel 20 and then reverse bent equally slightly towards the wheel 20 so that the mounting base 30 sits generally parallel to but slightly away from the wheel 20. The mounting base 30 attaches over the wheel stud 10 through the aperture 31 of the mounting base 30 and is secured to the wheel 20 by use of the lug nut 12. See FIG. 2.

Generally, the mounting base 30 has three portions, a first flat portion 36 that is flush with the wheel 20, a second flat portion 37 that bends away from the wheel 20 and a third flat portion 32 that is generally planar parallel to the wheel 20 but is raised off of the wheel 20. Attached to the third flat portion 32 of the mounting base 30 and forming a mounting column 38 are a square mount 33, a circular mount 34 and a latch portion 35. In the preferred embodiment, the square mount 33 sits immediately on top of the mounting base 30. The circular mount 34 fits immediately on top of the square mount 33. A latch 35 fits immediately on top of the circular mount 34. See FIG. 3.

A square chain connector 50 is provided. The square chain connector 50 is functionally adapted to fit over the square mount 33 of the mounting base 30. In the preferred embodiment, the square chain connector 50 is a generally rectangular metal strip with a square aperture 52 at one end 54. The second end 56 of the metal strip is then bent generally outwardly from the wheel 20 and also has a flat section 58 that is generally parallel to the wheel 20 and then another section or lip 59 that is bent generally perpendicularly towards the wheel 20. This configuration allows for the positioning of the second end 56 of the square chain connector 50 directly over the lug nut 12. This particular arrangement makes it extremely difficult, if not impossible, to access the lug nut 12 and considerably impedes or altogether thwarts the progress of thieves. The first end 72 of the chain 70 is attached to the second end 56 of the square chain connector 50, preferably by weldment.

Functionally adapted to be situated immediately on top of a square chain connector 50 is the circular chain connector 60. The circular chain connector 60 fits flush with the circular mount 34 of the mounting column 38. At one end of the circular chain connector 60 is a circular aperture 62. At the second end 64 of the circular chain connector 60 is the second end 74 of the chain 70.

The latch portion 35 of the mounting column 38 is designed to allow a cylinder lock 90 to fit over the top of the latch 35. In the preferred embodiment, the latch 35 is either machined or forged so that the latch 35 has two flat surfaces 42. The flat surfaces 42 lie in parallel planes. A groove 44 is defined around the circumference of the latch 35. This provides for a pair of generally identical and oppositely projecting radial lobes 46.

Figure 5:
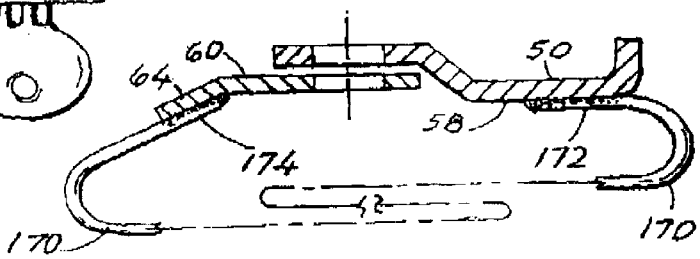
FIG. 5 is a partial top plan and sectional view of an alternative embodiment of the wheel locking device shown in FIG. 1 and taken along line 2—2 of FIG. 1.

The assembly 100 of the present invention provides a chain 70 to secure around the axle, or some similarly sturdy part, of a vehicle to prevent vehicle movement. Each end of the chain is attached to either the circular chain connector 60 or the rectangular chain connector 50, which each can be secured to the mounting base 30. A chain 70 is exemplary of only one of many means available to secure the wheel 20 of the vehicle 1. For example, this inventor envisions use of a stainless steel cable having a sleeve of some protective material, such as Kevlar, to further protect the chain from the possibility of damage or cutting by thieves. As shown in FIG. 5, an alternative embodiment of the assembly 100 of the present invention illustrates such a cable 170 shown attached at one end 172 to the rectangular connector 50 and at the other end 174 to the circular connector 60. Function of the assembly 100 with use of such a cable 170 would be the same in all respects as when the chain 70 is used.

The preferred embodiment of the assembly 100 of the present invention employs a cylinder lock 90 to secure the circular chain connector 60 and square chain connector 50 to the mounting base 30. However, the type of lock shown is meant solely to illustrate and not to limit this portion of the disclosure of the invention. The inventor is aware of several types of locks including, but not limited to, padlocks, combination locks and other cylinder locks that will secure the circular chain connector 60 and the square chain connector 50 to the mounting base 30. However, by way of explanation, but not of limitation, the cylinder lock 90 employed with the preferred embodiment will be generally explained.

The cylinder lock 90 receives a key 92 through a keyhole 94. As is known in the art, the lock core (not shown) is of a standard construction and includes an outer sleeve and an inner plug that are relatively rotatable with respect to one another when unlocked with a key 92. See FIG. 2. An axially projecting drive cog (also not shown) engages a retainer 80 and rotates the retainer 80 between a locked and an unlocked state. This is accomplished because the retainer 80 is constructed to include a retainer base 82, a retainer arm 84, a retainer shoulder 86 extending from the arm 84 and a shoulder flat 88. It is this shoulder flat 88 that engages the latch groove 44 of the column 38 mounted on the mounting base 30 to lock the cylinder lock 90 to the base 30.

In application, the user of the assembly 100 of the present invention has previously mounted the mounting base 30 to one of the lugs 10 of the wheel 20 of the vehicle 1 with which the assembly 100 will be used. The user places the rectangular chain connector 50 over the mounting base 30 such that the square mount 33 of the mounting column 38 engages the square hole 52 of the connector 50. The user leads the chain 70, or the cable 170, about the frame member 2 of the vehicle 1 such that the circular chain connector 60 overlays the rectangular chain connector 50. The round hole 62 of the circular chain connector 60 engages the mounting column 38 and the cylinder lock 90 engages the latch 35 of the mounting column 38. The cylinder lock 90 is secured and the key 92 removed. To remove the assembly 100, the reverse of this procedure is performed. When not in use, the assembly 100 can be placed within a relatively compact configuration for ease of storage.

From the foregoing, it will be apparent that there has been provided a new and useful wheel-locking assembly that deters, or renders impossible, the unauthorized movement of the vehicle to which it is attached; that can be attached conveniently and easily; that is adaptable to a wide variety of wheel sizes and is particularly useful with solid wheels; that is easy to carry and store when not in use; and that is relatively simple in construction and inexpensive to produce. The present invention has been described with some degree of particularity directed to the exemplary embodiment of the present invention. It should be appreciated that the present invention is defined by the following claims construed in light of the prior art so that modifications or changes may be made to the preferred embodiment of the present invention without departing from the inventive concepts contained herein.

The principles of this invention having been fully explained in connection with the foregoing, I hereby claim as my invention:

1. A tire locking assembly for use with a wheeled vehicle that employs a wheel stud and a lug nut to secure a wheel to the vehicle comprising a mounting base attached to said wheel stud and secured by the lug nut, said mounting base consisting of a strip of metal material with an aperture that encircles the wheel stud, angles slightly upward and then levels parallel to the wheel surface and provides a mounting column consisting of a square mount, a circular mount and a latch head, a chain, said chain having a first end and a second end, and means for removably securing the first end and the second end of the chain to said mounting base.

2. The tire locking assembly of claim 1 wherein the means for securing the first end of the chain consists of a first chain connector that is connected at one end to the first end of the chain and has a square aperture that fits over the square mount of the mounting base at its second end.

3. The tire locking assembly of claim 2 wherein the square mount is angled such that, when the first chain connector overlays the square mount, the first chain connector provides a shield that prevents tampering with the wheel stud and lug nut.

4. The tire locking assembly of claim 3 wherein the means for securing the second end of the chain consists of a second chain connector connected to the second end of the chain and has a circular aperture that fits over the circular mount of the mounting base at its second end.

5. The tire locking assembly of claim 4 wherein the means for securing the chain consists of a key actuated cylinder lock.

6. The tire locking assembly of claim 5 wherein the chain consists of a length of metal cable.

7. The tire locking assembly of claim 6 wherein the cable is surrounded by a tough material that resists breakage and cutting.

8. A tire locking assembly for use with vehicles that employ a wheel stud and a lug nut to secure a wheel to the vehicle comprising a mounting base, said mounting base including a circular aperture fitting the wheel stud and a mounting column, a chain, said chain having a first end and a second end, a first chain connector attached to the first end of said chain having an aperture for encircling the mounting column, a second chain connector attached to the second end of said chain having an aperture for encircling the mounting column, wherein a locking device attached to said mounting column can secure the first chain connector and the second chain connector to the mounting column.

9. The tire locking assembly of claim 8 wherein the mounting base consists of a strip of metal with an aperture that encircles the wheel stud, angles slightly upwardly and then levels parallel to the wheel surface and the mounting column consists of a square mount, a circular mount and a latch head.

10. The tire locking assembly of claim 9 wherein the first chain connector is connected at one end to the chain and at the other end has a square aperture that fits over the square mount of the mounting base.

11. The tire locking assembly of claim 10 wherein the square mount is angled so that when the first chain connector is on the square mount the first chain connector provides a shield that prevents tampering with the wheel stud and lug nut.

12. The tire locking assembly of claim 11 wherein the second chain connector is connected at one end to the chain and at the other end has a circular aperture that fits over the circular mount of the mounting base.

13. The tire locking assembly of claim 10 wherein the locking device consists of a key actuated cylinder lock.

14. The tire locking assembly of claim 13 wherein the chain consists of a length of metal cable.

15. The tire locking assembly of claim 14 wherein the cable is surrounded by a tough material that resists breakage and cutting.

\* \* \* \* \*